United States Patent
Kato et al.

(10) Patent No.: US 9,248,811 B2
(45) Date of Patent: Feb. 2, 2016

(54) VEHICLE DRIVING SUPPORT APPARATUS

(75) Inventors: Hiroki Kato, Tokyo (JP); Yuji Kii, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 13/419,297

(22) Filed: Mar. 13, 2012

(65) Prior Publication Data
US 2012/0239266 A1  Sep. 20, 2012

(30) Foreign Application Priority Data

Mar. 16, 2011  (JP) ................... 2011-058395

(51) Int. Cl.
*B60T 7/12* (2006.01)
*B60T 7/22* (2006.01)
*B60W 10/188* (2012.01)
*B60W 30/09* (2012.01)
*B60W 30/095* (2012.01)

(52) U.S. Cl.
CPC ............. *B60T 7/22* (2013.01); *B60W 10/188* (2013.01); *B60W 30/09* (2013.01); *B60W 30/0953* (2013.01); *B60T 2201/02* (2013.01); *B60T 2230/04* (2013.01)

(58) Field of Classification Search
CPC ......... B60T 2201/02; B60T 2201/022; B60T 2201/024; B60T 2201/083; B60T 7/12; B60W 10/188; B60W 30/09; B60W 30/0953; B60W 30/095; B60W 30/0956; B60W 30/14; B60W 30/143; B60W 30/146; B60W 30/16; B60W 30/162; B60W 30/165; B60W 30/17
USPC ........................................... 701/70
See application file for complete search history.

(56) References Cited

U.S. PATENT DOCUMENTS

2008/0015765 A1* 1/2008 Sekine et al. ................. 701/78

FOREIGN PATENT DOCUMENTS

| JP | 2008-120141 A |   | 5/2008 |
| JP | 2008120141 A | * | 5/2008 |

* cited by examiner

*Primary Examiner* — Mussa A Shaawat
*Assistant Examiner* — Kyung Kim
(74) *Attorney, Agent, or Firm* — McGinn IP Law Group PLLC

(57) ABSTRACT

A pressure reduction start distance is obtained (S9) based upon a deceleration after an operation of an automatic brake. When an obstacle-to-vehicle distance between a vehicle and an obstacle ahead becomes a distance obtained by adding the pressure reduction start distance to a target stopping distance to the obstacle ahead, the reduction of the brake pressure is started (S11) to suppress a pitching vibration generated before and after the vehicle stops. When the obstacle-to-vehicle distance becomes a stopping brake start distance that is just before the target stopping distance, the brake pressure is increased (S13) so as to allow the vehicle to stop.

11 Claims, 5 Drawing Sheets

VEHICLE DRIVING SUPPORT APPARATUS

CROSS-REFERENCE TO RELATED APPLICATIONS

The present application claims priority from Japanese Patent Application No. 2011-058395 filed on Mar. 16, 2011, the entire contents of which are hereby incorporated by reference.

BACKGROUND OF THE INVENTION

1. Field of the Invention

The present invention relates to a vehicle driving support apparatus that prevents an occurrence of a pitching vibration before and after a vehicle stops due to an operation of an automatic braking.

2. Description of Related Art

A driving support apparatus represented by an ACC (Adaptive Cruise Control) system or a pre-crash control system conventionally often employs an onboard camera or a radar device as a unit for monitoring an environment in front of a subject vehicle. The ACC system controls a vehicle speed, following a preceding vehicle that is travelling in front of the subject vehicle. When it is determined that the subject vehicle approaches rapidly to the preceding vehicle, and a target inter-vehicle distance cannot be maintained with engine braking, the ACC system operates an automatic braking in order to bring the inter-vehicle distance back to the target inter-vehicle distance. On the other hand, the pre-crash braking system determines a possible collision with an obstacle in front of the vehicle, (hereinafter referred to as an "obstacle ahead"), including the preceding vehicle, and when it determines that the collision is unavoidable, it operates the automatic braking so as to avoid a collision.

Japanese Patent Application Laid-Open (JP-A) No. 2008-120141 describes a technique involved with an operation of an automatic braking system as described below. Specifically, when it is determined that the preceding vehicle is substantially stopped, a deceleration for allowing the subject vehicle to stop at a set position is obtained according to the distance between the subject vehicle and the preceding vehicle, and the automatic braking is operated with a braking pressure according to the deceleration.

In the technique described in JP-A No. 2008-120141, the braking pressure is set based upon the distance between the subject vehicle and the preceding vehicle. Therefore, the braking pressure is not reduced before the subject vehicle stops, whereby the front part of the subject vehicle greatly sinks down, which is called a nose dive, immediately before the subject vehicle stops. Upon the stop, a swinging-back occurs as a reaction of the nose dive. The nose dive and a pitching vibration caused by the swing-back thereof give an uncomfortable feeling to a passenger.

A possible solution for preventing the pitching vibration is to temporarily reduce the braking pressure immediately before the vehicle stops. However, in order to efficiently suppress the pitching vibration, the timing of reducing the braking pressure has to be set based upon a road condition (snowy road, icy road, dry road) and the weight of the subject vehicle.

In this case, an additional sensor is required for detecting the road condition or the weight of the vehicle, which not only makes a control complicated, but also increases the number of components, leading to a cost increase.

SUMMARY OF THE INVENTION

The present invention is accomplished in view of the above-mentioned circumstance, and aims to provide a vehicle driving support apparatus that suppresses a pitching vibration, which is generated before and after a vehicle stops when the automatic braking is operated, without additionally mounting a special sensor, thereby reducing an uncomfortable feeling given to a passenger, and providing good ride comfort.

An aspect of the present invention provides a vehicle driving support apparatus including: a forward-monitoring unit that is mounted on a vehicle for monitoring a driving environment ahead of the vehicle in advancing direction thereof; a time-to-collision calculating unit that detects an obstacle ahead based upon the driving environment ahead of the vehicle, which is detected by the forward-monitoring unit, and obtains a time-to-collision based upon an obstacle-to-vehicle distance between the obstacle ahead and the vehicle and a relative vehicle speed; and an automatic braking control unit that operates an automatic braking, reduces a braking pressure immediately before a target stopping position, and increases the braking pressure until immediately before the vehicle stops, when the time-to-collision obtained by the time-to-collision calculating unit is less than a predetermined braking assist determination time. The automatic braking control unit obtains a braking pressure reduction start distance between the obstacle ahead and the vehicle based upon a deceleration during the operation of the automatic braking. When the obstacle-to-vehicle distance reaches the pressure reduction start distance, the automatic braking control unit reduces the braking pressure. Then, when the obstacle-to-vehicle distance reaches a predetermined stopping braking start distance immediately before the vehicle stops, it increases the braking pressure.

DETAILED DESCRIPTION OF THE PREFERRED EMBODIMENTS

Figure 1:
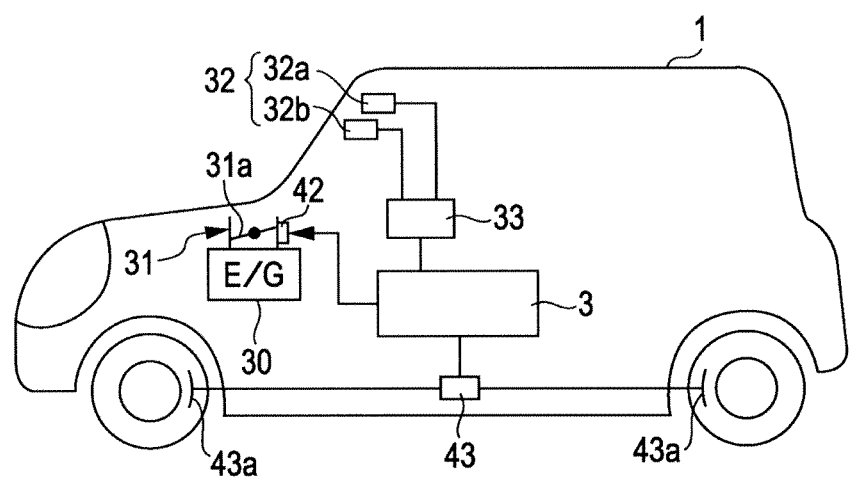
FIG. 1 is a schematic diagram illustrating a configuration of a vehicle on which a vehicle driving support apparatus is mounted.

An embodiment of the present invention will be described with reference to the drawings. A vehicle 1 in FIG. 1 has mounted thereon an onboard camera 32 serving as a forward-monitoring unit. The onboard camera 32 is a stereo camera including a main camera 32a and a sub-camera 32b. An image of a driving environment ahead in the driving direction captured by the cameras 32a and 32b is subjected to a predetermined image process and output by an image processing unit (IPU) 33.

Figure 2:
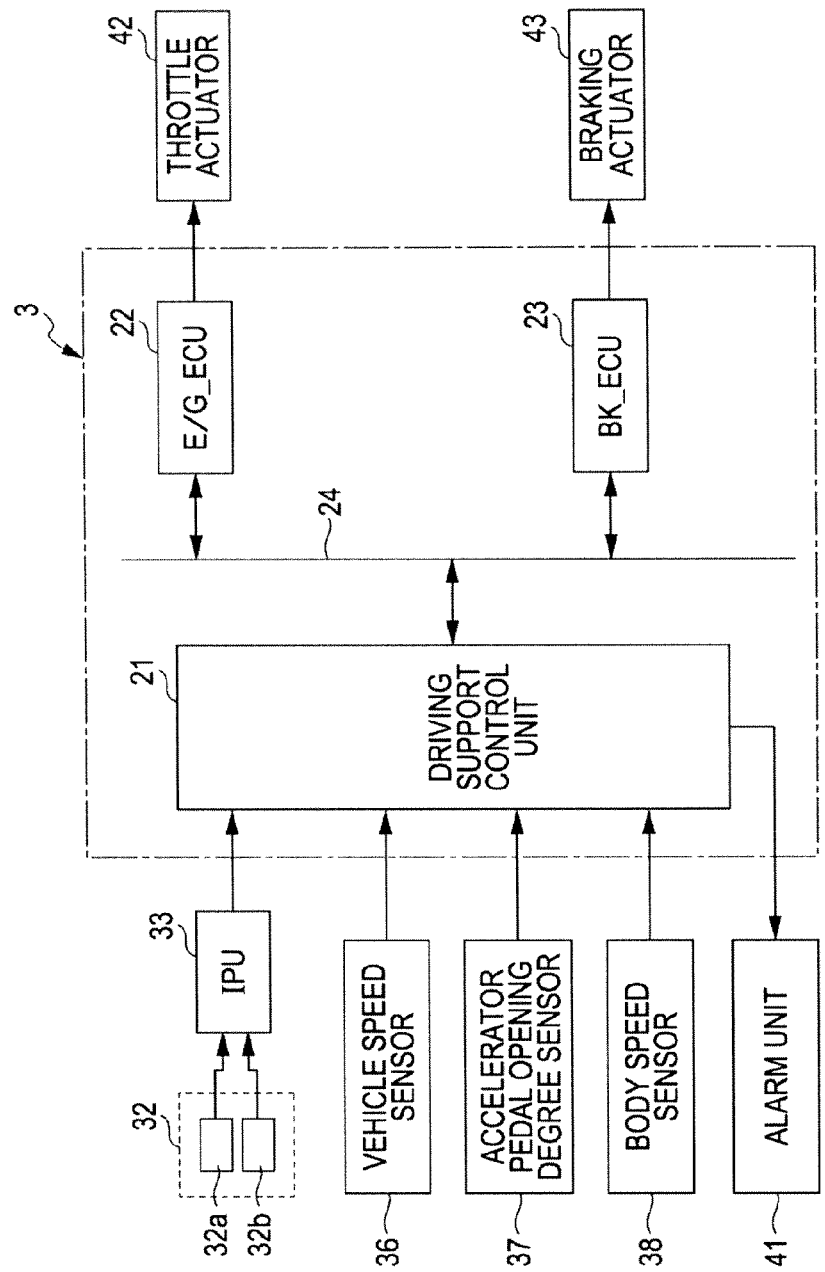
FIG. 2 is a diagram illustrating the configuration of the vehicle driving support apparatus.

As illustrated in FIG. 2, a vehicle driving support apparatus 3 includes various control units such as a driving support control unit 21, an engine control unit (hereinafter referred to as a "E/G_ECU") 22, and a braking control unit (hereinafter referred to as "BK_ECU") 23. The control units are interconnected via an in-vehicle communication line 24 such as CAN (Controller Area Network). Each of the units 21 to 23 are composed of a microcomputer including a CPU, ROM, RAM, and the like, and the ROM stores a control program for implementing an operation set for each system.

To an input side of the driving support control unit 21 are connected various sensors including an IPU 33, a vehicle speed sensor 36 for detecting a vehicle speed S [Km/h], an accelerator pedal opening degree sensor 37 for detecting a depression amount AP [%] of an accelerator pedal by a driver, and a body speed sensor 38 for detecting a body speed SAV. In the present embodiment, the body speed SAV is estimated from an average value of wheel speeds detected by a wheel speed sensor provided to each of four wheels. Therefore, in this case, the wheel speed sensors provided to the wheels are collectively referred to as the body speed sensor 38. Alternatively, if the vehicle 1 has mounted thereon a GPS (Global Positioning System) device, the body speed SAV may be obtained from a moving distance per a unit time of the vehicle 1 based upon a GPS signal received from a GPS satellite. In this case, the GPS device serves as the body speed sensor 38.

To an output side of the driving support control unit 21 is connected an alarm unit 41 such as a buzzer, warning lamp, or speaker. A throttle actuator 42 provided to an electronic control throttle 31 is connected to an output side of the E/G-ECU 22, while a braking actuator 43 for forcibly operating braking is connected to an output side of the BK-ECU 23.

As illustrated in FIG. 1, the electronic control throttle 31 is provided to the engine 30 on a side of an intake passage. A throttle valve 31a of the electronic control throttle 31 is opened and closed by the throttle actuator 42, and the operation of the throttle actuator 42 is controlled by the E/G_ECU 22. Therefore, the E/G_ECU 22 controls the operation of the throttle actuator 42 so as to adjust the opening degree of the throttle valve 31a, whereby a desired engine output can be obtained.

The braking actuator 43 adjusts the braking hydraulic pressure applied to the braking wheel cylinder 43a that is provided to each wheel. When the braking actuator 43 is driven by a drive signal from the BK_ECU 23, the braking wheel cylinder 43a generates a braking force to each wheel, so that the vehicle is forcibly decelerated.

The driving support control unit 21 illustrated in FIG. 2 monitors an obstacle (obstacle ahead), that is captured by the onboard camera 32 and is present ahead in the advancing direction of the vehicle, based upon the image signal from the IPU 33. When the driving support control unit 21 detects the obstacle ahead, it obtains a time-to-collision TTC [sec] based upon the image captured by the onboard camera 32, and compares the time-to-collision TTC and a predetermined braking assist determination time To, so as to determine the possibility that the vehicle 1 will collide with the obstacle ahead. When the driving support control unit 21 determines that the possibility of a collision is high (TTC≤To), it issues an alarm from the alarm unit 41, and executes the automatic braking control.

Figure 3:
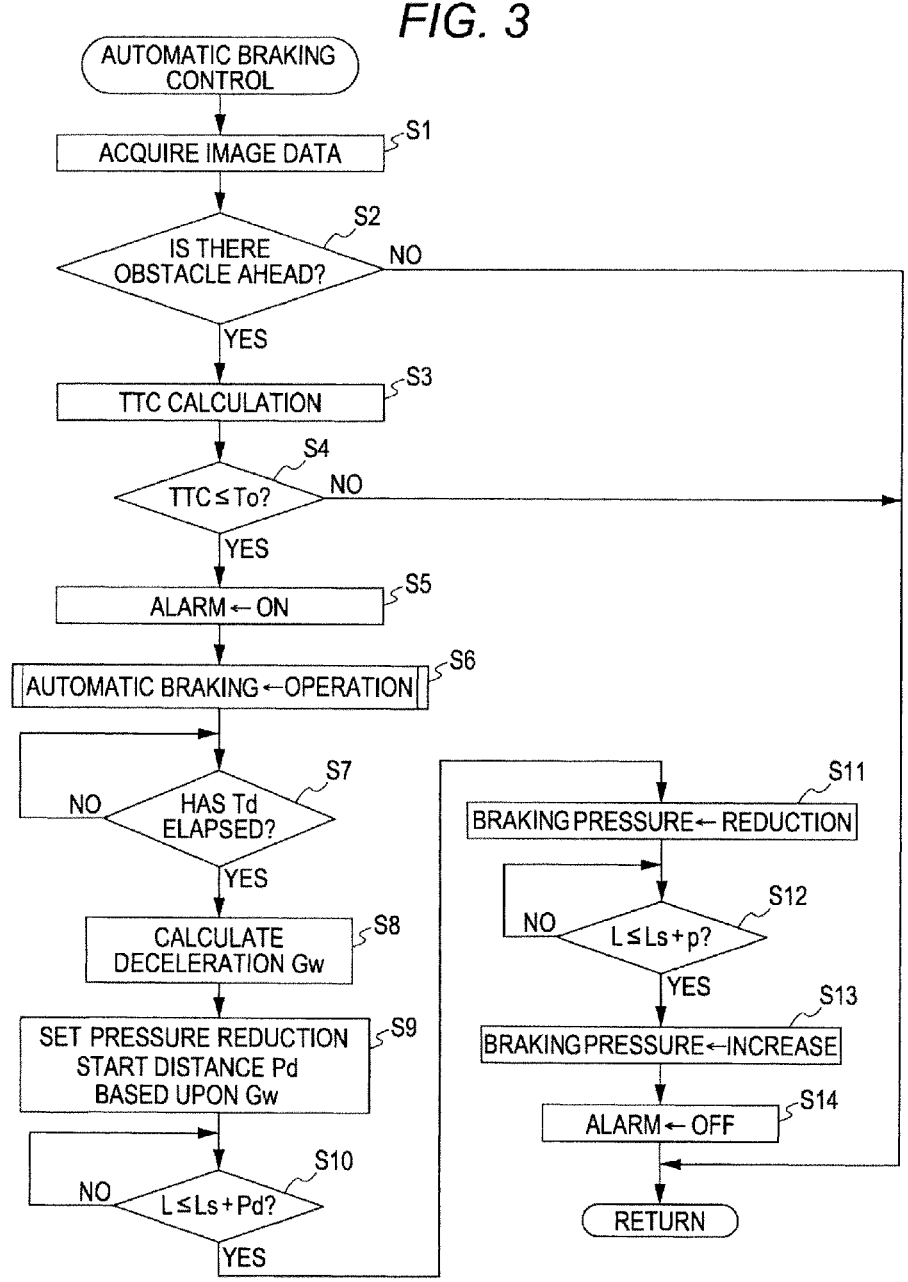
FIG. 3 is a flowchart illustrating an automatic braking control routine.
Figure 5:
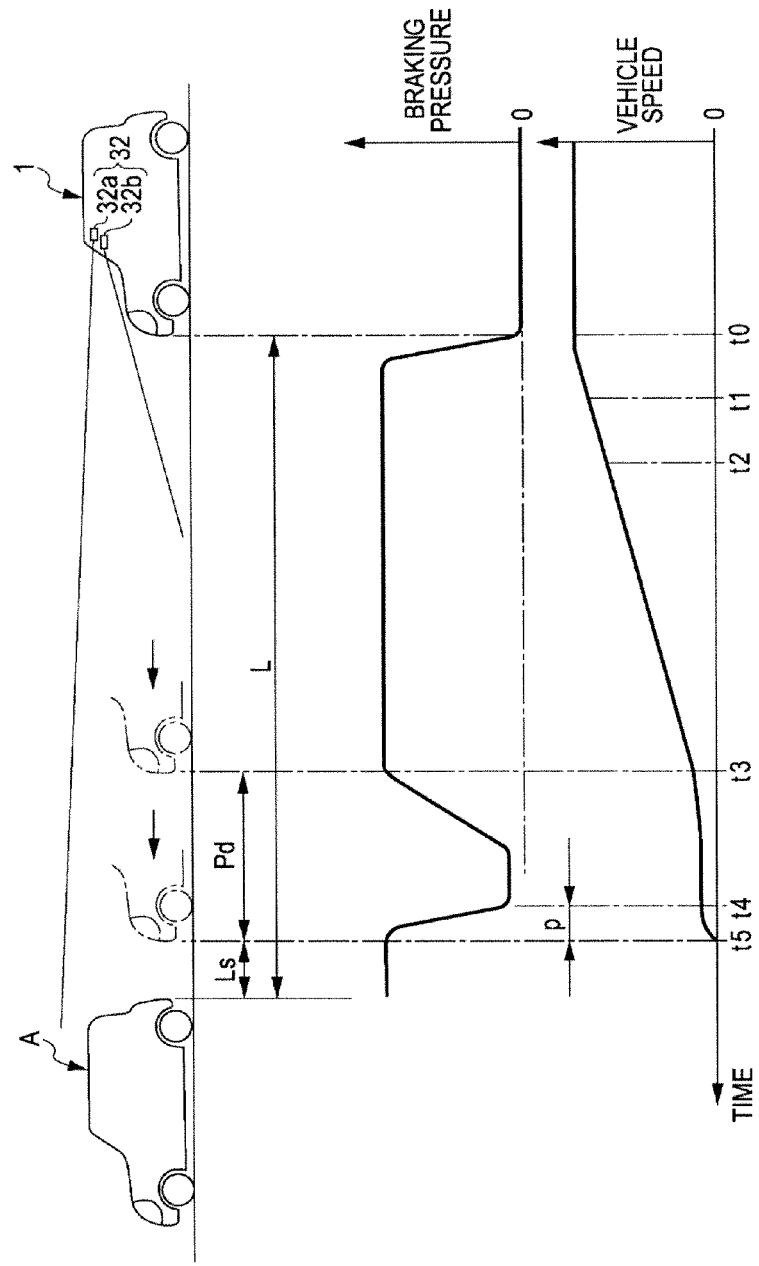
FIG. 5 is a time chart illustrating a control example of the automatic braking control.

The automatic braking control executed by the driving support control unit 21 is specifically processed according to an automatic braking control routine illustrated in FIG. 3. The process according to the automatic braking control routine will be described below with reference to the timing chart illustrated in FIG. 5. In FIG. 5, it is supposed that the obstacle ahead is a preceding vehicle A in front of the vehicle 1.

This routine is executed every predetermined calculation cycle after an ignition switch is turned on. Firstly, in step S1, parameters necessary for the automatic braking control are read, such as image data of the environment in front of the vehicle 1 captured by the onboard camera 32, the vehicle speed S detected by the vehicle speed sensor 36, the depression amount AP of the accelerator pedal detected by the accelerator pedal opening degree sensor 37, and the body speed SAV detected by the body speed sensor 38.

Then, in step S2, it is examined whether or not there is an obstacle ahead (a vehicle, which is stopped or is running, in front of the vehicle 1, oncoming vehicle, or a pedestrian crossing a road) in the advancing direction of the vehicle based upon the image data of the environment in front of the vehicle captured by the car-mounted camera 32. When an obstacle ahead is detected, the driving support control unit 21 proceeds to step S3. When an obstacle ahead is not detected, the driving support control unit 21 exits the routine.

When proceeding to step S3, the driving support control unit 21 calculates a distance (hereinafter referred to as a "obstacle-to-vehicle distance") L [m] between the vehicle 1 and the obstacle ahead captured by both cameras 32a and 32b based upon a parallax of both cameras 32a and 32b, and divides the obstacle-to-vehicle distance L by a relative vehicle speed $\Delta S$ [m/sec] between the obstacle ahead and the vehicle 1, thereby calculating a time-to-collision TTC [sec] (TTC←L/$\Delta S$). The processes in steps S2 and S3 correspond to the time-to-collision calculating unit of the present invention.

Subsequently, the driving support control unit 21 proceeds to step S4 where it compares the time-to-collision TTC [sec] and the predetermined braking assist determination time To [sec]. The braking assist determination time To is an estimated time by which the collision with the obstacle ahead cannot be avoided. As described later, in the present embodiment, a control for temporarily reducing the braking pressure is executed before the vehicle 1 is stopped at a target stopping position by the automatic braking. Therefore, the braking assist determination time To is set to a value considering, to some extent, an increase in the stopping distance caused by the reduction in the braking pressure. Accordingly, in the present embodiment, the braking assist determination time To is set to be, for example, 1.2 to 0.8 [sec], in order that the braking operation is started slightly earlier compared to a general automatic braking control.

When the time-to-collision TTC is less than the braking assist determination time To (TTC≤To), it is determined that the driver does not make the braking operation, or the braking force applied by the driver is weak and thus that the vehicle 1 is approaching the obstacle ahead. Then, the driving support control unit 21 proceeds to step S5. When TTC>To, it is determined that the vehicle can be stopped by the driver's brake operation, and the driving support control unit 21 exits the routine.

When proceeding to step S5, the driving support control unit 21 outputs an alarm signal to the alarm unit 41, in order to let the driver to know that the vehicle 1 is approaching the obstacle ahead with a buzzer sound or voice, or by lighting or flickering the warning lamp.

Then, the driving support control unit 21 proceeds to step S6 as to operate the automatic braking (an elapsed time t0 in FIG. 5). The automatic braking in the present embodiment employs an engine braking by fully closing the throttle valve 31a and a forced braking due to the operation of the braking wheel cylinder 43a.

Upon operating the automatic braking, a throttle full-close signal is firstly output to the E/GECU 22. Accordingly, the E/G ECU 22 fully closes the throttle valve 31a through the throttle actuator 42 of the electronic control throttle so as to operate the engine braking. Subsequently, a braking operation signal is output to the BK_ECU 23. With this process, the BK_ECU 23 outputs a drive signal to the braking actuator 43 for operating the braking wheel cylinder 43a, thereby forcibly stopping the wheels.

Then, the driving support control unit 21 proceeds to step S7 where it waits until a set time Td [sec] has elapsed after the operation of the automatic braking. The set time Td is a time (elapsed time t0 to t1 in FIG. 5) before the forced braking is surely operated. It is obtained and set beforehand from an experiment.

When the set time Td has elapsed, the driving support control unit 21 proceeds to step S8 to calculate a deceleration Gw [m/s$^2$]. The deceleration Gw is obtained from a variation in the body speed SAV, detected by the body speed sensor 38, in a predetermined section (elapsed times t1 to t2 in FIG. 5). In a vehicle provided with a longitudinal G sensor, the deceleration Gw may be obtained from an output of the longitudinal G sensor.

Figure 4:
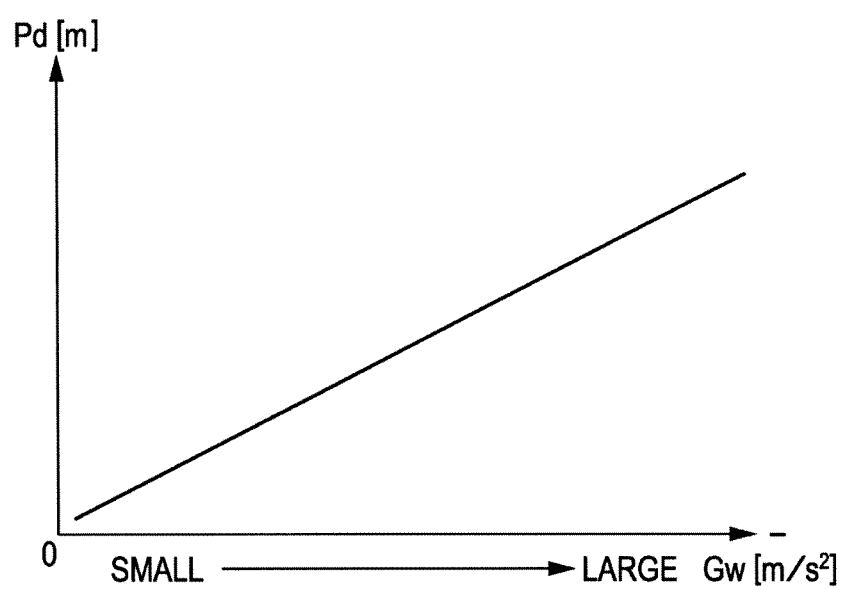
FIG. 4 is a conceptual view illustrating a pressure reduction start timing table.

Then, the driving support control unit 21 proceeds to step S9 where it refers to a pressure reduction start timing table with an interpolation calculation based upon the deceleration Gw, thereby setting a pressure reduction start distance Pd [m]. The pressure reduction start distance Pd is a distance from the obstacle ahead to the vehicle 1. The pressure reduction start distance Pd stored in the pressure reduction start timing table is set to have a substantially proportional characteristic, as illustrated in FIG. 4, in such a manner that the pressure reduction start distance Pd becomes longer as the deceleration Gw increases. Specifically, the braking distance upon the automatic braking operation depends upon a road friction coefficient (road μ) that is changed due to the road condition (snowy road, icy road, dry road) and the weight of the vehicle, when the vehicle speed and the braking pressure upon a free running state are constant. The braking distance becomes long in the case of a low μ road or a heavy weight of the vehicle, so that the deceleration Gw inevitably decreases.

It is necessary to set the pressure reduction start timing while securing the distance between the vehicle in front and the vehicle to be stopped. Accordingly, when the deceleration Gw is small, the pressure reduction start distance Pd is set to be relatively short since the braking distance becomes long. When the deceleration Gw is large, on the other hand, the pressure reduction start distance Pd is set to be long, because the braking distance becomes short.

Thus, during the operation of the automatic braking, even if the vehicle 1 temporarily reduces the braking pressure immediately before the later-described target stopping position (the target stopping distance with the obstacle ahead being defined as a reference), the vehicle 1 can be stopped at the target stopping position. Since the deceleration Gw depends upon the road condition, vehicle weight, and the intensity of the braking as described above, the pressure reduction start distance Pd does not have to be set by measuring the road μ or vehicle weight each time, so that the calculation is facilitated. There is no need to provide dedicated sensors, whereby the number of components can be reduced, leading to a production cost reduction.

Then, the driving support control unit 21 proceeds to step S10 where it waits until the obstacle-to-vehicle distance L [m] becomes the pressure reduction start distance (Ls+Pd) [m]. The Ls is the target stopping position (target stopping distance) that the vehicle 1 should maintain with respect to the obstacle ahead that is stopped. The target stopping distance Ls is a fixed value, and in the present embodiment, it is set to be about 1.5 to 2 [m].

When L≤Ls+Pd is established (at the elapsed time t3 in FIG. 5), the driving support control unit 21 proceeds to step S11 so as to reduce the braking pressure during the automatic braking control to a predetermined amount. In the present embodiment, the braking pressure is reduced in a stepwise manner with a predetermined ratio as illustrated in FIG. 5. Thus, t a large forward acceleration (forward G) generated upon rapid deceleration is unlikely to be released suddenly, whereby the swinging-back can be reduced, and the braking distance can be secured.

When the deceleration Gw generated by the automatic braking operation is large, a nose dive occurs on the vehicle 1 due to the forward G immediately before the vehicle 1 stops, and the swinging-back is produced due to the reaction of the nose dive when the vehicle 1 stops. The nose dive and the pitching vibration caused by the swinging-back increase as the deceleration Gw is larger. As described above, however, in the present embodiment, the pressure reduction start distance Pd is set in substantially proportion to the magnitude of the deceleration Gw. Therefore, when the deceleration Gw is large, the running distance of the vehicle when the braking pressure is reduced becomes long, so that the pitching vibration can efficiently be suppressed. Accordingly, an uncomfortable feeling given to a passenger is reduced, whereby a good ride comfort can be realized.

Then, the driving support control unit 21 proceeds to step S12 so as to examine whether or not the obstacle-to-vehicle distance L reaches a distance-immediately-before-stop (Ls+p) Reference symbol p denotes the position (stopping braking starting distance), immediately before the target stopping distance Ls, where the braking is re-started, and it is set to be approximately 0.5 [m] in the present embodiment.

When the obstacle-to-vehicle distance L reaches the distance-immediately-before-stop (Ls+p) (at the elapsed time t4 in FIG. 5), the driving support control unit 21 proceeds to step S13 so as to increase the braking pressure for stopping the vehicle (at the elapsed time t5 in FIG. 5). Then, the driving support control unit 21 proceeds to step S14 so as to stop outputting the alarm signal to the alarm unit 41. After stopping the alarm, the driving support control unit 21 exits the routine. The processes in steps S6 to S13 correspond to the automatic braking control unit according to the present invention.

As described above, in the present embodiment, when the automatic braking is operated to allow the vehicle 1 to stop at the target stopping position, the pressure reduction start distance Pd is set based upon the deceleration Gw of the vehicle 1 in order that the braking pressure is reduced until immediately before the vehicle stops after the obstacle-to-vehicle distance L reaches the pressure reduction start distance Pd. Therefore, the pitching vibration generated on the vehicle 1 before and after the vehicle 1 stops is remarkably reduced. Accordingly, an uncomfortable feeling given to a passenger is reduced, whereby a good ride comfort can be realized.

The deceleration Gw applied on the vehicle 1 depends upon the road condition, vehicle weight, and the intensity of the braking. Therefore, when the pressure reduction start distance Pd is set, it is not necessary to set the pressure reduction start distance Pd does by measuring the coefficient of friction on a road μ or vehicle weight, so that the calculation is facilitated. Further, there is no need to provide dedicated sensors, whereby the number of components can be reduced, leading to a production cost reduction.

The present invention is not limited to the above-mentioned embodiment. For example, instead of measuring the obstacle-to-vehicle distance L based upon the image captured by the onboard camera 32, the obstacle-to-vehicle distance L may be measured based upon a laser radar, a millimeter wave radar, or an ultrasonic sensor, which scans an environment ahead of the vehicle 1 in the advancing direction.

What is claimed is:

1. A vehicle driving support apparatus comprising:
a forward-monitoring unit to monitor a driving environment ahead of a vehicle in an advancing direction of the vehicle, the forward-monitoring unit is mounted to the vehicle;
a time-to-collision calculating unit to detect an obstacle ahead using the driving environment ahead of the vehicle, which is detected by the forward-monitoring unit, and to calculate a time-to-collision when the vehicle collides with the obstacle ahead using an obstacle-to-vehicle distance between the obstacle ahead and the vehicle and a relative vehicle speed; and
an automatic braking control unit to operate an automatic braking to stop the vehicle and to avoid a collision with the obstacle ahead when the time-to-collision is less than a predetermined braking assist determination time,
wherein the automatic braking control unit, when starting to operate the automatic braking, calculates a braking pressure reduction start distance proportional to a deceleration of the vehicle using the deceleration of the vehicle within a predetermined time of the start of the automatic braking, the braking pressure reduction start distance where a control for temporarily reducing a braking pressure by the automatic braking starts to be executed before the vehicle is stopped at a target stopping position by the automatic braking, reduces the braking pressure by the automatic braking when detecting that the obstacle-to-vehicle distance is equal to or less than the pressure reduction start distance, and increases the reduced braking pressure when the obstacle-to-vehicle distance is equal to or less than a predetermined stopping braking start distance immediately before the vehicle stops.

2. The vehicle driving support apparatus according to claim 1, wherein the automatic braking control unit fully closes a throttle valve when the automatic braking is operated.

3. The vehicle driving support control apparatus according to claim 2, wherein the automatic braking control unit reduces the braking pressure in a stepwise manner with a predetermined ratio.

4. The vehicle driving support control apparatus according to claim 1, wherein the automatic braking control unit reduces the braking pressure in a stepwise manner with a predetefinined ratio.

5. The vehicle driving support control apparatus according to claim 1, further comprising a sensor which outputs the deceleration of the vehicle.

6. The vehicle driving support control apparatus according to claim 1, wherein the braking pressure reduction start distance is proportional to the deceleration of the vehicle.

7. The vehicle driving support control apparatus according to claim 6, wherein the braking pressure reduction start distance becomes longer as the deceleration of the vehicle increases.

8. The vehicle driving support control apparatus according to claim 6, wherein the braking pressure reduction start distance becomes shorter as the deceleration of the vehicle decreases.

9. The vehicle driving support control apparatus according to claim 1, wherein a deceleration of the vehicle immediately before the vehicle stops is greater than a deceleration of the vehicle immediately before the target stopping position.

10. The vehicle driving support control apparatus according to claim 1, wherein the automatic braking control unit further:
operates the automatic braking to decelerate the vehicle when the time-to-collision is less than a predetermined braking assist determination time at a first deceleration value;
reduces the braking pressure of the automatic braking to decrease the deceleration of the vehicle immediately before a target stopping position at a second deceleration value that decreases in a stepwise manner; and
increases the reduced braking pressure to increase the deceleration of the vehicle until immediately before the vehicle stops at a third deceleration value,
wherein the first deceleration value is greater than the second deceleration value, and
wherein the third deceleration value is greater than a smallest value of the second deceleration value.

11. A vehicle driving support apparatus comprising:
a forward-monitoring unit that is mounted to a vehicle for monitoring a driving environment ahead of the vehicle in the advancing direction;
a time-to-collision calculating unit that detects an obstacle ahead based upon the driving environment ahead of the vehicle, which is detected by the forward-monitoring unit, and obtains a time-to-collision based upon an obstacle-to-vehicle distance between the obstacle ahead and the vehicle and a relative vehicle speed; and
an automatic braking control unit that:
operates an automatic braking to decelerate the vehicle when the time-to-collision is less than a predetermined braking assist determination time;
reduces a braking pressure of the automatic braking to decrease a deceleration of the vehicle immediately before a target stopping position, set in advance, that the vehicle maintains with respect to the obstacle ahead; and
increases the reduced braking pressure to increase the deceleration of the vehicle until immediately before the vehicle stops.

* * * * *